United States Patent
Chang (10) Patent No.: US 8,693,476 B2
(45) Date of Patent: *Apr. 8, 2014

(54) DYNAMIC UPDATE OF ROUTE TABLE

(75) Inventor: Stephen S. Chang, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 165 days.

This patent is subject to a terminal disclaimer.

(21) Appl. No.: 13/114,644

(22) Filed: May 24, 2011

(65) Prior Publication Data

US 2011/0286458 A1 Nov. 24, 2011

Related U.S. Application Data

(63) Continuation of application No. 12/168,616, filed on Jul. 7, 2008, now Pat. No. 8,111,615.

(51) Int. Cl.
*H04L 12/28* (2006.01)

(52) U.S. Cl.
USPC ....... 370/392; 370/221; 370/395.31; 710/302

(58) Field of Classification Search
None
See application file for complete search history.

(56) References Cited

U.S. PATENT DOCUMENTS

| | | | | | |
|---|---|---|---|---|---|
| 4,922,408 | A | * | 5/1990 | Davis et al. | 709/252 |
| 5,166,927 | A | * | 11/1992 | Iida et al. | 370/238 |
| 6,950,394 | B1 | * | 9/2005 | Chou et al. | 370/229 |
| 7,194,581 | B2 | | 3/2007 | Vogt | |
| 8,111,615 | B2 | * | 2/2012 | Chang | 370/221 |
| 2002/0156918 | A1 | | 10/2002 | Valdevit et al. | |
| 2003/0131170 | A1 | * | 7/2003 | Chen et al. | 710/302 |
| 2004/0215865 | A1 | | 10/2004 | Arimilli et al. | |
| 2005/0135256 | A1 | * | 6/2005 | Ball et al. | 370/238 |

FOREIGN PATENT DOCUMENTS

| | | |
|---|---|---|
| JP | 2007-166347 A | 6/2007 |
| JP | 2008-048010 A | 2/2008 |

OTHER PUBLICATIONS

Office Action Received for Chinese Patent Application No. 200910159869.X, mailed on Feb. 26, 2013, 3 pages of Office Action and 5 pages of English Translation.

Office Action Received for German Patent Application No. 10 2009 031 870.4-31 mailed on Nov. 2, 2010, 9 Pages of Office Action including English translation.

Office Action Received for Chinese Patent Application No. 200910159869.X, mailed on Oct. 31, 2012, 3 pages of Office Action and 5 pages of English Translation.

(Continued)

*Primary Examiner* — Ayaz Sheikh
*Assistant Examiner* — Hai-Chang Hsiung
(74) *Attorney, Agent, or Firm* — Caven & Aghevli LLC (57) ABSTRACT

A method and apparatus for dynamically modifying routing information in an interconnect architecture without quiescence is herein described. Each agent/node holds routing information regarding target agents/nodes in an interconnect architecture, which may include routing preferences. When a node is to be hot removed, it generates port disable messages to neighbors. The neighbors disable a port the disable message is received on and generates a completion message back to the not to be removed. The node to be removed continues to route messages until it receives a completion; at which time it disables a corresponding node. When all nodes are disabled the device may be removed. Other nodes in the interconnect architecture learn of an agent removal through use of return cycles when messages reach dead ends during attempted routing of cycles. Furthermore, hot addition of a node includes broadcasting of an enable message to enable nodes for routing to the added node.

20 Claims, 7 Drawing Sheets

(56) References Cited

OTHER PUBLICATIONS

Notice of Decision to Grant Received for German Patent Application No. 10 2009 031 870.4, mailed on Sep. 24, 2012, 9 pages of Notice of Decision to Grant and 2 pages of reporting letter in English.

Office Action Received for German Patent Application No. 10 2009 031 870.4, mailed on Jun. 14, 2012, 2 pages of Office Action and 1 page of English Translation.

Notice of Allowance Received for the Japanese Patent Application No. 2009-160233, mailed on Jun. 26, 2012, 1 page of Notice of Allowance only.

Office Action Received for U.S. Appl. No. 12/168,616, mailed on Aug. 19, 2010, 13 pages.

Office Action Received for U.S. Appl. No. 12/168,616, mailed on Feb. 11, 2011, 14 pages.

Office Action Received for Japanese Patent Application No. 2009-160233 mailed on Jun. 28, 2011, 3 pages of Office Action and 3 pages of English Translation.

Notice of Allowance Received for U. S. Appl. No. 12/168,616, mailed on Jul. 12, 2011, 15 pages.

Office Action Received for Chinese Patent Application No. 200910159869.X mailed on Nov. 23, 2011, 5 pages of Office Action and 8 pages English Translation.

* cited by examiner

DYNAMIC UPDATE OF ROUTE TABLE

CROSS-REFERENCE TO RELATED APPLICATION

This application is a continuation of patent application Ser. No. 12/168,616 filed on Jul. 7, 2008, and entitled "DYNAMIC UPDATE OF ROUTE TABLE". This application is incorporated herein by reference in its entirety.

FIELD

This invention relates to high speed point to point interconnect links, and in particular, to routing in a point-to-point interconnect architecture.

BACKGROUND

As computers have evolved, they have moved from the realm of simple arithmetic computing, to media centers for any number of media and non-media applications. As a result, computer systems often include any number of peripheral or input/output devices. Furthermore, the advancement in semiconductor processing and computer design have enabled computer systems to include more transistors and processing power on single physical processors, while also allowing multiple physical processors to reside in a single system. Previously, these processors and other devices were added to a computer system when the power was off, to allow the computer to correctly initialize and handle new components.

However, more recently, designers have enabled users to add or remove components/devices during runtime of the machine. Often this type of removal has been referred to as a "hot add" or "hot removal" of a device/component. Yet, hot add and removal of components is not limited to physical addition or removal from a system. In fact, software designers, such as Operating System (OS) designers, have also supported hot add or removal from a software's perspective. In other words, a hot removed device may still be physically present, powered down, not recognized by software, virtually removed, or any combination thereof.

As a corollary to the advancement of integrated circuits, and the processing power thereof, interconnects between the devices has also advanced to provide adequate bandwidth to high-power components. One type of interconnect architecture includes a coherent link based architecture. As a specific example, components in the architecture may be coupled utilizing point-to-point links, where devices/agents are viewed as nodes to route messages to each other.

Currently, when a component, agent, and/or node is "hot added" or "hot removed" from this type of interconnect architecture, the entire system is halted to update routing information to incorporate or deallocate the hot added or hot removed device, accordingly. Often this halt, or quiescence, results in a flushing of all current messages, as new routing information may cause routing errors with regard to the messages, a halt or quiescence of the system, and an update to routing tables by some external software or firmware, such as Basic Input Output Software (BIOS). As can be imagined, this quiescence process for adding or removing an agent is potentially expensive, which results in a potentially slower end-user experience.

BRIEF DESCRIPTION OF THE DRAWINGS

The present invention is illustrated by way of example and not intended to be limited by the figures of the accompanying drawings.

DETAILED DESCRIPTION

In the following description, numerous specific details are set forth such as examples of specific interconnect architectures, specific messages, specific routing table implementations, specific interconnect architecture layers, etc. in order to provide a thorough understanding of the present invention. It will be apparent, however, to one skilled in the art that these specific details need not be employed to practice the present invention. In other instances, well known components or methods, such as specific interconnect layer architectural details/logic, specific non-relevant messages and protocols, specific operational details of processors and caches, etc. have not been described in detail in order to avoid unnecessarily obscuring the present invention.

The method and apparatus described herein are for providing support for dynamic modifications to routing information without quiescence. Specifically, dynamic modification of routing information is primarily discussed in reference to an illustrative cache-coherent link based interconnect architecture, which is described in more detail below. However, the methods and apparatus for modifying routing information without coherence in an interconnect architecture are not so limited, as they may be implemented with any known interconnect architecture.

Embodiment of an Illustrative Interconnect Architecture

Figure 1:
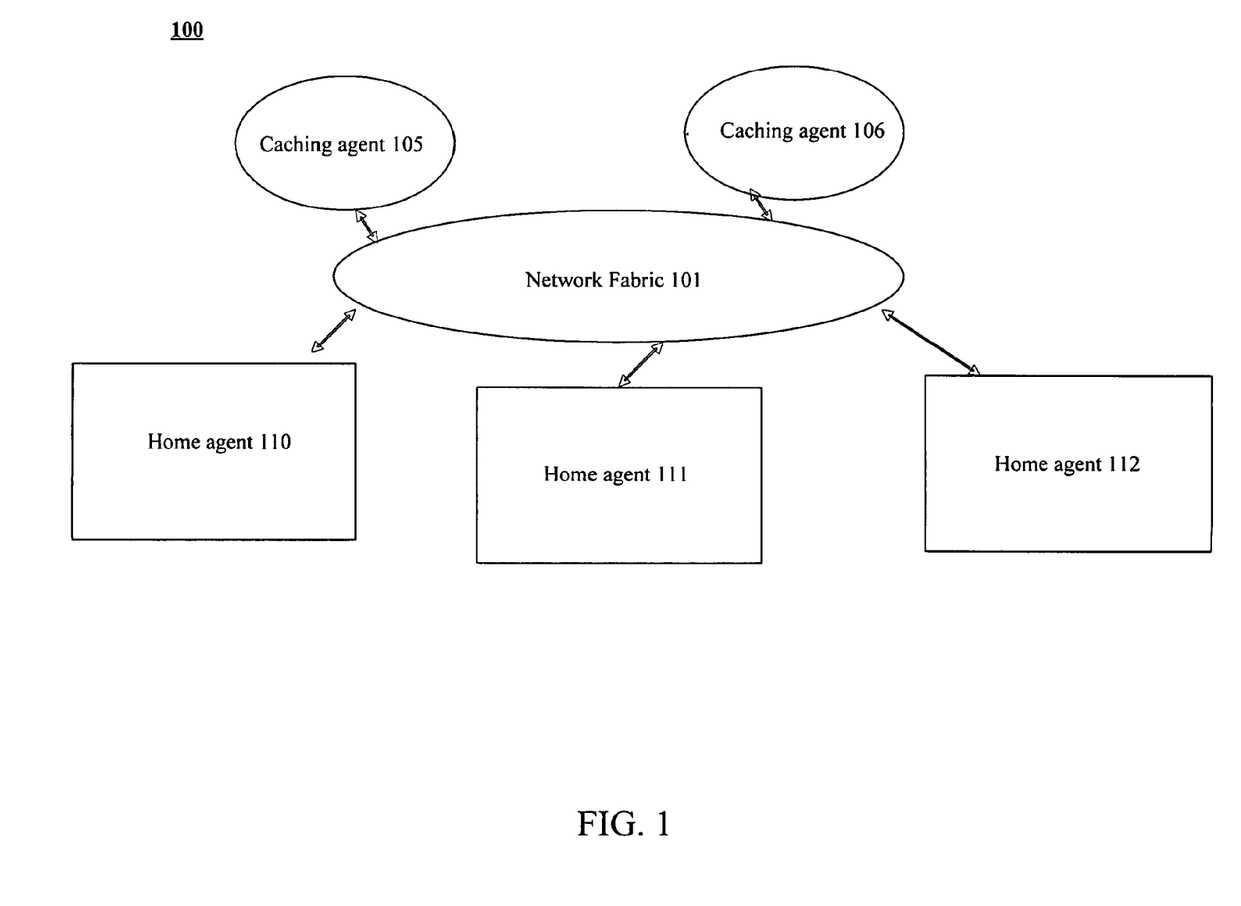
FIG. 1 illustrates an embodiment of a protocol architecture.

FIG. 1 illustrates an embodiment of a high-level simplified protocol architecture. In one embodiment, the protocol architecture is to maintain data consistency between data in caches within the architecture during normal transactions, as well as during conflicting requests. In addition, the protocol architecture, in one embodiment, also provides forward progress for each request, such that each request is satisfied and retired/completed.

A protocol architecture may include any number of nodes or agents. In one embodiment, a node includes a processor that is associated with an internal cache memory, an external cache memory, and/or an external memory. However, a node or agent may refer to any device, or collection thereof, in an interconnect architecture, such as a processor, a memory controller hub, and I/O hub, a generic controller hub, I/O device, a collection of I/O devices, or any other device/component capable of accessing memory. In another embodiment, a node is an electronic system (e.g., computer system, mobile device) interconnected with other electronic systems. Other types of node configurations may also be used.

As illustrated, architecture 100 includes caching nodes/agents 105-106 and home agents 110-112. In one embodiment, home agents 110-112 are to guard memory locations, which are final repositories of a coherent memory space. In other words, agent 110 is a home agent responsible for a plurality of original physical memory locations for data of a coherent memory space. Home agents 110-112 may perform any combination of the following tasks including: tracking cache state transitions from caching agents 105-106, managing conflicts amongst caching agents 105-106, interfacing to memory, providing data and/or ownership, as well as any other known home agent related tasks.

In one embodiment, caching agents 105-106 include agents that are associated with cache memories, such as processors including cache memories and caching I/O proxy entities. Cache agents 105-106 may perform any combination of the following tasks, as well as any other tasks, such as performing read and write requests into coherent memory space, holding cached copies of data from coherent memory space, and supplying cached copies to other peer caching agents. A caching agent or node may also be referred to as a peer agent/node in relation to another caching agent. Although not illustrated specifically in FIG. 1, the protocol architecture may also include non-caching agents, such as an Input/Output (I/O) Hub to participate or witness transactions on behalf of I/O devices.

In one embodiment, caching agents 105-106 and home agents 110-112 maintain data consistency and provide forward progress through exchanging messages over network fabric 101. In one embodiment, fabric 101 facilitates transporting of messages from one agent/node to another agent/node through a point-to-point interconnect network. It is often said that FIG. 1 depicts a cache coherence protocol's abstract view of an underlying network.

In one embodiment, interconnect architecture 100 may incorporate any combination of novel features, as described in the following co-pending applications. For example, U.S. Pat. No. 6,922,756 and entitled "Forward State for Use in Cache Coherency in a Multi-Node System," describes utilization of a Forward cache coherency state (F-state). Furthermore, examples of coherence protocols in various situations are discussed in application Ser. No. 10/833,963, filed Apr. 27, 2004, entitled "A Two-Hop Cache Coherency Protocol," application Ser. No. 10/833,965, filed Apr. 27, 2004, entitled "A Messaging Protocol," application Ser. No. 10/833,977, filed Apr. 27, 2004, entitled, "A Cache Coherence Protocol," application Ser. No. 11/330,977, filed Jan. 11, 2006, entitled, "A Two-Hop Source Snoop Based Cache Coherence Protocol," and application Ser. No. 11/331,301, filed Jan. 11, 2006, entitled, "A Two-Hop Source Snoop Based Messaging Protocol,"

Other examples include, application Ser. No. 10/325,427, filed Dec. 19, 2002, entitled "Speculative Distributed Conflict Resolution for a Cache Coherency Protocol;" application Ser. No. 10/326,234, filed Dec. 19, 2002, entitled "Hierarchical Directories for Cache Coherency in a Multiprocessor System;" application Ser. No. 10/324,711, filed Dec. 19, 2002, entitled "Hierarchical Virtual Model of a Cache Hierarchy in a Multiprocessor System;" application Ser. No. 10/326,232, filed Dec. 19, 2002, entitled "Non-Speculative Distributed Conflict Resolution for a Cache Coherency Protocol;"

Note that the features described in the aforementioned co-pending applications may be incorporated in the embodiments described herein; however, the embodiments described herein are not so limited as they may include additional features, as well as potentially none of the features described above.

Figure 2:
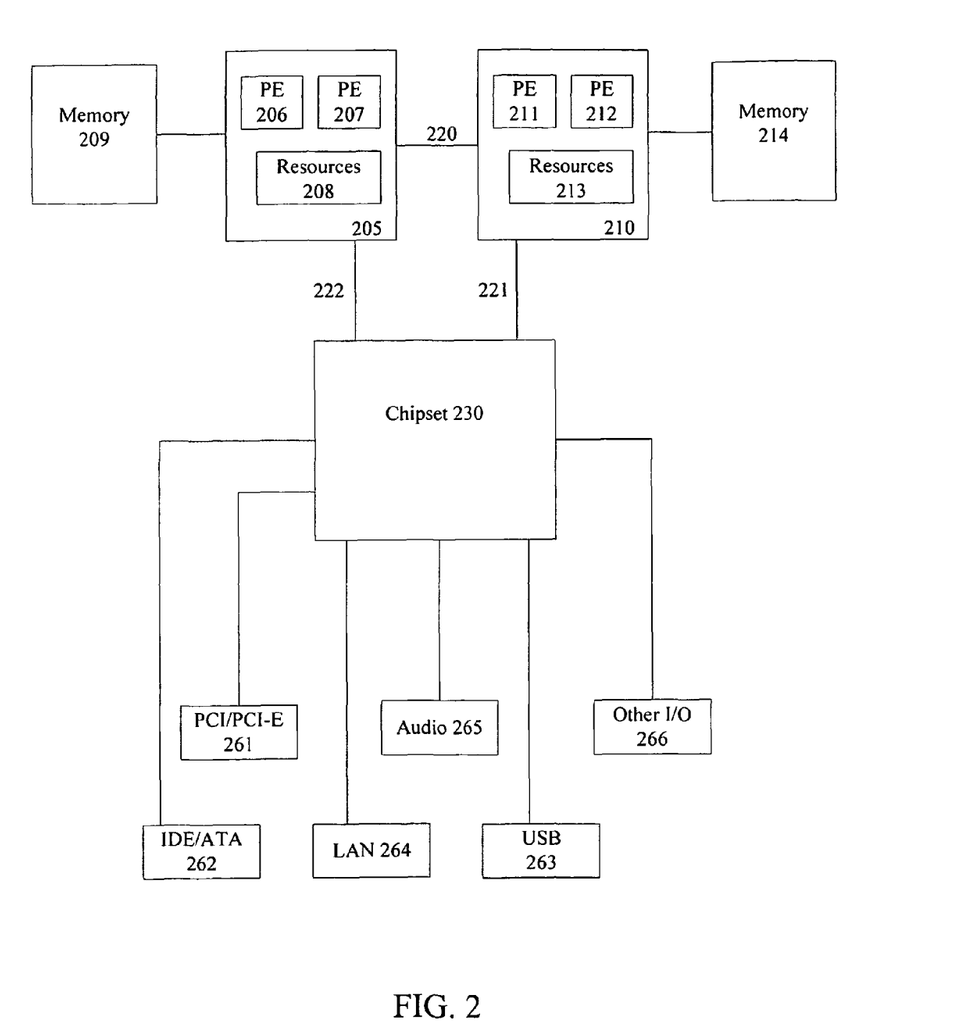
FIG. 2 illustrates an embodiment of a system including multiple processors coupled to a chipset utilizing a point-to-point interconnect.

FIG. 2 illustrates an embodiment of a system including multiple processors coupled to a chipset utilizing a point-to-point interconnect architecture. The system of FIG. 2 may also include several processors, of which only two, processors 205, 210 are shown for clarity. As illustrated, processors 205, 210 each include two processing elements 206-207, 211-212; although, any number of processing elements may be included in processors 205, 210.

A processing element refers to a thread unit, a process unit, a context, a logical processor, a hardware thread, a core, and/or any other element, which is capable of holding a state for a processor, such as an execution state or architectural state. In other words, a processing element, in one embodiment, refers to any hardware capable of being independently associated with code, such as a software thread, operating system, application, or other code. As an example, a physical processor typically refers to an integrated circuit, which potentially includes any number of other processing elements, such as cores or hardware threads.

A core often refers to logic located on an integrated circuit capable of maintaining an independent architectural state, wherein each independently maintained architectural state is associated with at least some dedicated execution resources. In contrast to cores, a hardware thread, which may also be referred to as a physical thread, typically refers to any logic located on an integrated circuit capable of maintaining an independent architectural state, wherein the independently maintained architectural states share access to execution resources. Therefore, as can be seen, multiple software threads, such as multiple replications of a single-threaded application, in one embodiment, are capable of being executed in parallel on multiple processing elements, which may include a combination of any of the aforementioned processing elements, such as cores or hardware threads.

Also illustrated in processors 205, 210 are resources 208, 213, which typically include registers, units, logic, firmware, memory, and other resources to execute code or interface with other devices. As stated above, some of resources 110 may be partially or fully dedicated to processing elements, while others are shared among processing elements. For example, smaller resources, such as instruction pointers and renaming logic may be replicated for physical threads. Some resources, such as re-order buffers in a reorder/retirement unit, instruction lookaside translation buffer (ILTB), load/store buffers, and queues may be shared through partitioning. Other resources, such as general purpose internal registers, page-table base registers, low-level data-cache, a data-TLB, execution unit(s), and an out-of-order unit are potentially fully shared among threads. In contrast, cores may have dedicated execution resources, while sharing at least a portion of a higher level cache, such as a second level cache (L2).

In one embodiment, resources 208, 213 include a processor pipeline, which may include any number of pipeline stages. Common examples of pipeline stages include an instruction pointer stage, a fetch stage, a decode stage, a drive stages, and allocate stage, a renaming stage, a queue stage, a reorder stage, a schedule stage, a dispatch stage, an execution stage, a memory access stage, and a register access stage. Note this list of stages includes an exemplary non-exhaustive list of processor pipeline stages, as any known pipeline stages may be included in processor 100.

Processors 205, 210 may each also include a memory controller or a local memory controller hub (MCH) to interface with memory 209, 214, accordingly. Memories 209, 214 include any memory device, such as a Random Access Memory (RAM), cache memory, flash memory, or other memory device. In one embodiment, memory 214 includes a higher-level cache memory, while resources 213 includes a low-level cache memory. In another embodiment, memory 209 includes a Dynamic Random Access Memory (DRAM)

associated with processor 205, which includes a cache memory to cache data from DRAM 209. Note this is an illustrative embodiment, as memories 209,214 potentially include any style memory device.

In one embodiment, where memories 209,214 include cache memories either included within processors 205,210, or external thereto as illustrated, processors 205,210 are capable of being a home node as well as a peer caching node. For example, when a transaction references a memory location within memory 209, the agent responsible for memory 209, i.e. processor 205, is determined to be a home agent in relation to the transaction and the memory location. Similarly, with a transaction referencing another memory location, such as a location in memory 214, processor 205 is determined to be a peer-caching agent.

As can be seen, point-to-point links 220-224 couple components together in a point-to-point fashion. Physical links 220-224, in one embodiment, each include a bidirectional differential signaling interconnect, such as the physical links associated with a physical layer discussed below in reference to FIG. 3. As a result, processors 205,210 and chipset 230 are capable of direct communication with each other.

Chipset 230 is often a generic reference to multiple integrated circuits, such as a memory controller hub coupled to an input/output (I/O) hub. However, in one embodiment, where agents each include a version of a memory controller hub to interface with memory, chipset 230 refers to an I/O hub or other controller hub. In one embodiment, chipset 230, as discussed above, is a non-caching agent to participate or witness transactions. However, chipset 230 is not so limited, as in other embodiments, chipset 230 is a caching agent including a cache memory and/or a home agent including a memory having original memory location repositories for data.

As illustrated, chipset 230 is also to interface with a plurality of interconnect and I/O devices, such as Peripheral Component Interconnect (PCI) or PCI Express (PCI-E) device 261, Integrated Device Electronics (IDE) or Advanced Transfer Attachment (ATA) device 262, Universal Serial Bus (USB) device 263, Local Area Network (LAN) or Wireless LAN (WLAN) device 264, Audio device 265, and Other I/O device 266, which may also include another interconnect architecture for coupling I/O devices as described herein.

Figure 3:
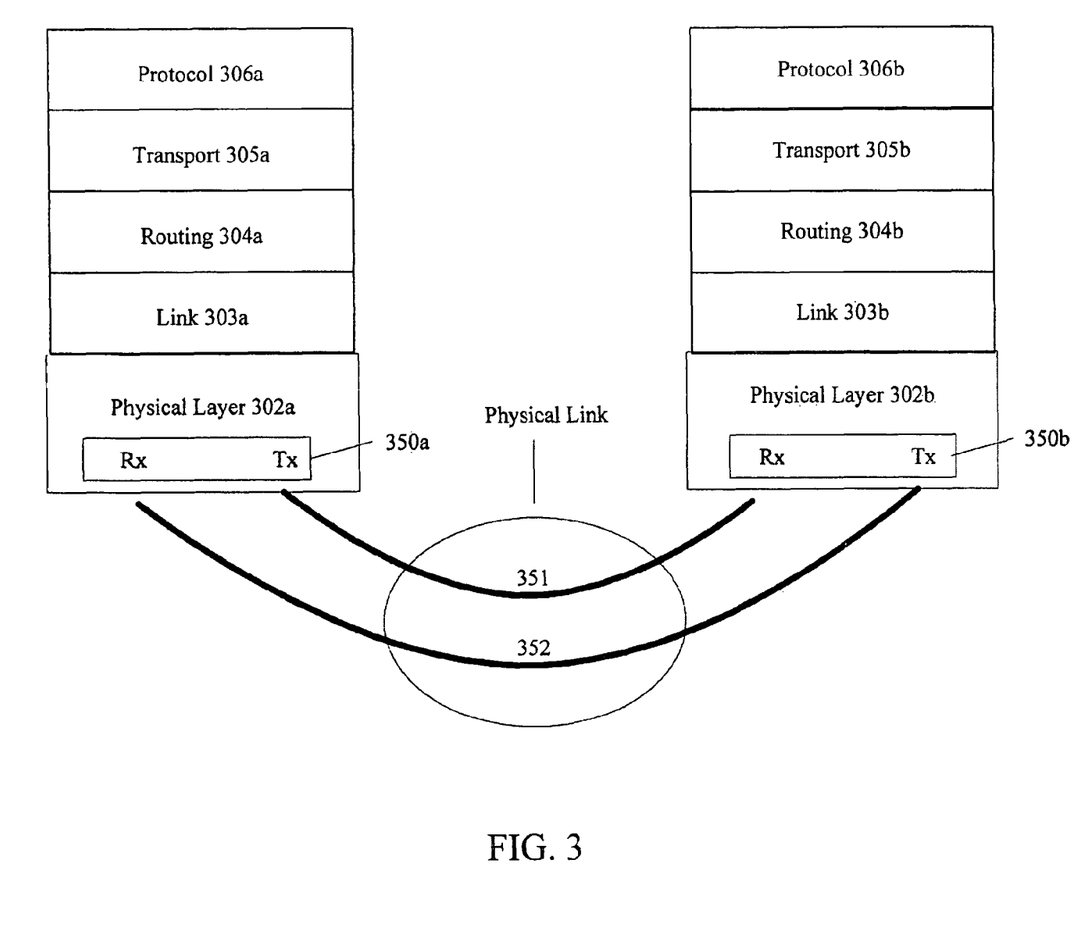
FIG. 3 illustrates an embodiment of a block diagram for a bidirectional interconnect architecture utilizing a layered input/output (I/O) stack.

Referring to FIG. 3, an embodiment of a block diagram for a bidirectional interconnect architecture utilizing a layered interconnect stack is illustrated. Reference to layers of FIG. 3, such as a physical layer 302, includes discussion of a generic layer, which may be implemented in different agents, such as physical layer 302a and physical layer 302b. As depicted, the interconnect stack is partitioned into five layers, one or more of which are potentially optional based on a design implementation. For example, routing layer 304, in one embodiment, is embedded in the functionality of link layer 303; hence, routing layer, in one embodiment, is not a separate and distinct layer.

In one embodiment, physical layer 302 is responsible for electrical transfer of information on a physical medium. For example, a physical point-to-point link is utilized between link layer entities 303a and 303b. As an illustrative example, the physical link includes a differential signaling scheme, which includes a bidirectional differential signaling pair 351 and 352. Here, the physical layer is potentially logically divided into an electrical sub-block and a logical sub block, such that the physical layer is to isolate the rest of the stack from the electrical transfer of information and is to communicate with link layer 303.

In one embodiment, link layer 303 abstracts physical layer 302 from upper layers of the stack and provides link related services, such as reliable data transfer and flow control between connected agents/entities and virtualization of a physical channel/interface into multiple virtual channels and message classes. Here, virtual channels may be viewed as multiple virtual networks for use by upper layers of the stack. For example, protocol layer 306 potentially relies on the abstraction provided by link layer 303 to map a protocol message into a message class and, therefore, to one or more virtual channels.

Routing layer 304, in one embodiment, provides a flexible method for routing packets from a source to a destination. As stated above, in extremely simple topologies, routing layer 304 may not be explicit, but rather integrated into the functionality of link layer 303. For example, routing layer 304 may rely on the abstraction of link layer 303 to specify a <port, virtual network> pair to route a packet.

In one embodiment, routing layer 304, or logic associated therewith through its functionality, is to hold routing information, such as a routing table. As a specific example, a routing table may include an entry for each target in an interconnect architecture. Here, the entry may hold any type of information, such as a port or ports to route a packet associated with a target agent through. Routing tables and associated information are discussed in more detail below.

In one embodiment, transport layer 305 provides end-to-end reliable transmission services. Similar to routing layer 304, transport layer 305 is also optional based on design implementation. As an example, transport layer 305 relies on routing layer 304 services to provide reliable transmission support for protocol layer 306. Within an interconnect architecture, in one embodiment, a subset of components include transport layer 305. As a result, this subset of components define sub-fields of packets relating to transport layer 305, while other components potentially do not define those sub-fields.

Protocol layer 306, in one embodiment, is to implement a higher-level communication protocol between nodes/agents, such as cache coherence, ordering, peer-to-peer communication, interrupt deliver, etc. In other words, protocol layer 306 defines permissible messages, requests, responses, phases, coherence states, etc. for nodes or agents, such as home nodes, peer nodes, caching nodes, and non-caching nodes, accordingly. Examples of messages, such as home node messages, snoop messages, response messages, etc. are discussed below.

Note that discussion of layers, and logic associated therewith, may be coupled in any manner. For example, it may be said that protocol logic is coupled to physical layer, i.e. transmission or receiving logic. Here, as can be seen from FIG. 3, in one embodiment, protocol logic may not be directly coupled to physical layer logic, but rather coupled through other layer logic. Furthermore, the interconnect stack, in one embodiment, is coupled to inner component logic, such as cache control or cache memory logic, to initiate appropriate cache coherence actions.

Overview of an Embodiment of a MESIF Protocol

In one embodiment, the basic Modified Exclusive Shared Invalid Forward (MESIF) protocol provides a protocol similar to a snoop protocol without the potential limitations of a single, serializing bus. Like a snooping cache protocol, MESIF relies on nodes with cached copies of data to maintain coherence. The use of point-to-point links rather than a synchronous, centralized broadcast introduces the problem of time-warp, i.e. the fact that events appear to occur in a different order from the viewpoint of different nodes. As an example, the MESIF protocol handles time-warp through recognition of potential errors due to time-warp, and providing protocol or software solution thereto.

A home node is often associated with an uncached copy of data. As a result, a home node may participate in a transaction relating to data associated with the home node. However, the home node does not have to be included in a "critical path" associated with a transaction, but rather a home node may interject in the transaction to resolve conflicts and time-warp issues. Because of the concurrent-broadcast nature of the scheme, in one embodiment, MESIF achieves the low latency associated with snooping protocols, while acquiring a cacheable copy of the data, in certain cases, in the minimum possible latency: a single roundtrip request-response.

In one embodiment, a basic transaction related to a MESIF protocol involves broadcasting an initial request to all peer nodes as well as a home node. If a copy is cached in state E, F, or M coherency state, it is included in the response. A second message is then sent to the home node, informing it that the request has been satisfied. If the requested line is uncached, or if only S-state copies exist, the second request sent to the home node is used to confirm the previous request, which the home node may have, by now, fetched from its memory. In either case, the home node responds to the second request (and potentially to the first, though they can sometimes be combined) for purposes of synchronization and conflict resolution. Note that the home node may have one or more caches, so it may respond to the initial request just like any other node.

In one embodiment, conflicts are handled in a distributed way. The time-warp problem makes it difficult to detect conflicts, because individual requests can be delayed for an arbitrarily long time. A conflict will be detected, however, if each node monitors for conflicts after making a request. Multiple nodes may potentially detect a conflict, but as an example, at least one of the nodes will detect a conflict. As a result, a response from a node, in one embodiment, potentially includes conflict information.

In one embodiment, a node receiving a copy of the data from a response is allowed to use the data internally immediately upon receipt, but does not make the effects of using the data visible to the rest of the system, i.e. globally visible, until the node has received a confirmation. The confirmation may also include instructions that the requesting node must forward its copy to another node, and perhaps evict the node from its own cache.

Finally, when a node responds to a request from another node by supplying the cached data, the node, in one embodiment, defers other requests it receives for the same cache line until the node receives a response from the Home node acknowledging the fact that the node forwarded the data, thus assuring that all nodes observe the same order of transfer of the (possibly writable) cache line.

The home node, as stated above, is a repository for uncached data, but the home node also may include processor and a cache. Here, when the home node processor misses the cache, the home node broadcasts requests to all other (peer) nodes, and the home node handles the request internally as it would any other request arriving for the home node. Note that this is a special case, in that the home node does not explicitly send messages to itself (the Home node). In addition, when an external request arrives for data that is cached locally, the home node responds appropriately.

The disclosed message protocol defines a set of allowed messages between coherence (cache and home) agents, non caching agents, as well as other agents (memory controllers, processors, etc). A coherence protocol uses the messages as words and grammar in an algorithm to express a coherent thought. This algorithm sensibly orders requests, resolves conflicts, and describes interactions between caching agents. Although, a MESIF protocol is described above, the MESIF cache coherence protocol is not required to be utilized. For example, the Forward state may not be utilized, which results in utilization of the known MESI protocol. Furthermore, note the discussion above includes an exemplary overview of an embodiment for a MESIF protocol. Consequently, various components described above may differ in separate embodiments. A non-exhaustive exemplary list of potential messages utilized in a messaging and/or coherence protocol are included below.

Figure 4:
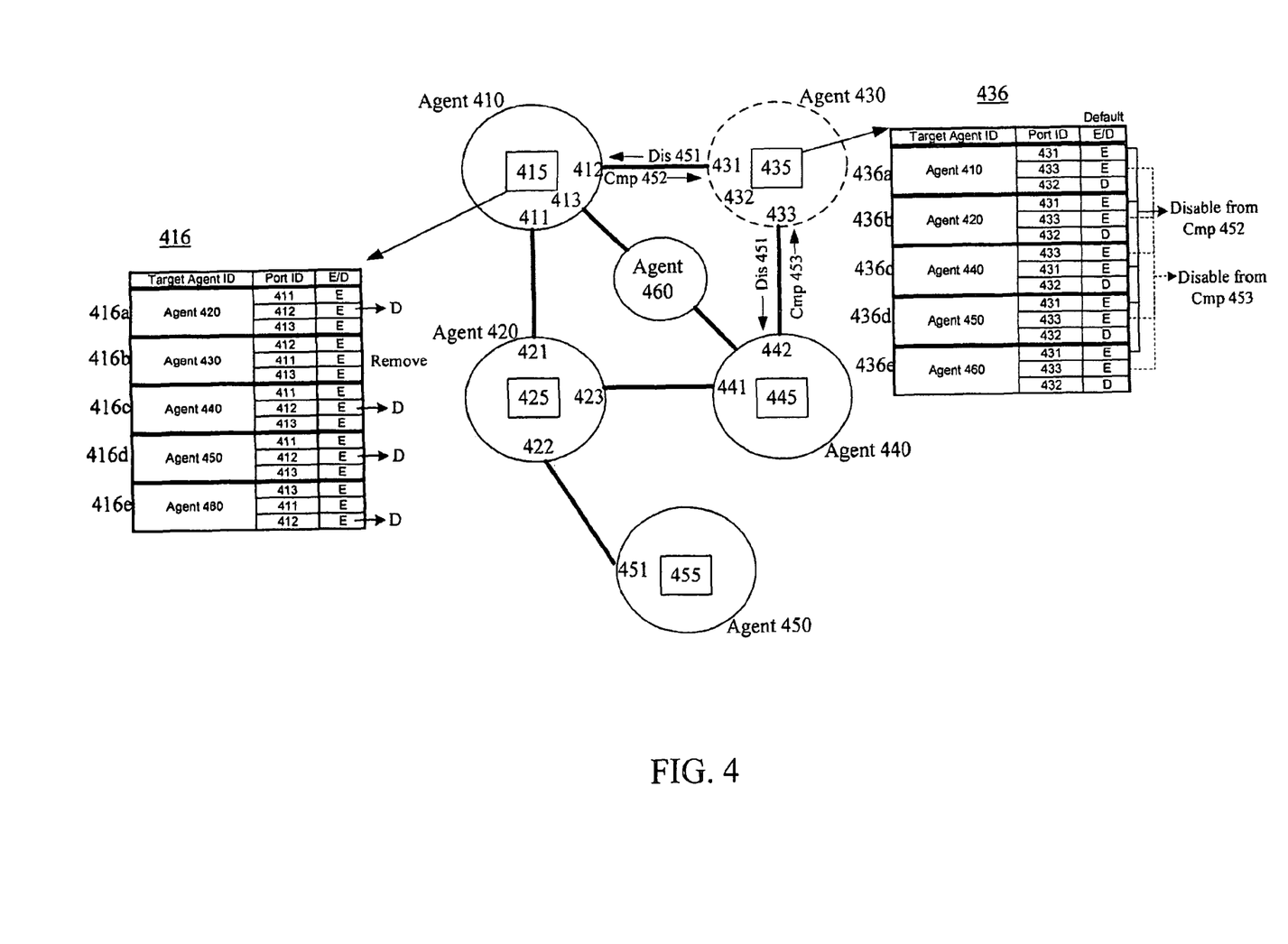
FIG. 4 illustrates an embodiment of multiple agents including logic to hold tables having target entries associated with multiple ports.

Referring to FIG. 4, an embodiment of multiple agents including logic to hold tables having target entries associated with multiple ports is illustrated. As stated above, agents 410, 420, 430, 440, 450, and 460 (410-460), which may also be referred to as nodes, may be any style agent or node, such as a processor, a controller hub, an I/O device, or any other known agent/node.

In one embodiment, agents 410-460 are included in a link based coherent interconnect architecture. As illustrated, agents 410-460 are coupled to each other in a point-to-point fashion, such that agent 410 transmits a message directed at agent 450 on port 411 to agent 420, which receives the message on port 421, and routes the message through port 422 to agent 450. As discussed below, any other number of paths to agent 450 may exist, such as through agents 460, 440, and then 420 to 450. Although dynamic modification of routing information is primarily discussed in reference to a point-to-point link architecture, the method and apparatuses described herein are not so limited.

Furthermore, in one embodiment, at least some of agents 410-460 are to implement an interconnect stack, such as the interconnect stack discussed above. Note that in some embodiments, where layers of an interconnect stack are implemented in logic, boundaries of the layers may not be clearly defined, as well as partially overlap. For example, as discussed above, routing layer logic may potentially be implemented within or partially overlap link layer logic.

In one embodiment, each of agents 410-460 includes logic, such as logic 415, 425, 435, 445, and 445, to hold routing information. For example, logic 415 is to hold routing table 416 for agent 410. Typically, when a message, which may be in the form of a packet, is transmitted, the references some target, destination, or other identifier (ID). As a result, in one embodiment, routing table 416 includes a plurality of entries, such as entries 416*a-e*, associated with a plurality of destination or target agents/nodes, agents 420-460, accordingly. Here, the plurality of entries 416*a-e* provides routing information for packets/messages referencing a target or destination ID.

For example, assume agent 410 receives a packet from agent 430 that references a target ID associated with agent 450. In one embodiment, table 416 is indexed utilizing target IDs, or a representation thereof, for target agents. As a result, the entry for agent 450 is determined, and a port to route the packet on is determined from the associated port list. Here, the packet is determined to be routed on port 411. Similarly, when agent 420 receives the message, routing logic 425 is utilized to route the packet on port 422 to agent 450. Previously, each target agent was associated with only a single port for routing, such as port 411 for agent 440. However, if agent 420 is removed from the system, then a quiescence state would be utilized to update the port for agent 440 from 411 to 413 or 412, which potentially results in a long expensive update process by BIOS or other software.

Therefore, in one embodiment, a target entry is associated with a plurality of ports in a preferential order or manner. In other words, a routing entry for a target agent may provide a preference amongst available ports in an agent for routing to the target agent. Note that preference may be based on any number of factors, such as a port being enabled/disabled, a transmission time associated with a port to the target agent, a number of hops or intermediary agents/nodes from a port to the target agent, a number of lost packets routed on a port, or any other known routing preference factor. Furthermore, preference may be illustrated in any manner, such as a bit encoding to represent which ports are preferred, or a simple ordered list where one port listed before the other indicates a higher or lower preference based on the implementation.

As an example, agent 420 is associated with all three ports 411-413 of agent 410 in entry 416a. Here, a preference list is utilized to order the ports, i.e. port 411 has a higher preference that port 412, as indicated by being higher in the list. Furthermore port 412 has a higher priority that port 413 for entry 416a. However, note in different entries, there may be different priorities/preferences, such as in entry 416e where port 413 is the highest preference. Therefore, when a message is received by agent 410 to be routed to agent 420, in one embodiment, the message is routed on the "preferred" port, i.e. the highest priority port 411 based on the preferential order of ports in entry 416a.

Furthermore, in one embodiment, the plurality of ports are also associated with enable fields. For example, logic 435 in agent 430 is to hold route table 436. Route table 436 includes entries 436a-e. Each entry, such as entry 436a, is to hold a target identifier, i.e. agent 410 or a representation thereof, associated with a plurality of enable/disable fields for a plurality of ports in agent 430. Here, entry 436a includes port 431, having the highest priority for target agent 410, and port 433 enabled, while port 432 is disabled. Note that port 432 is disabled as it does not connect to any other agent/node.

In one embodiment, enable/disable fields include a bit vector to associate with the ports of agent 430, where a bit set represents the corresponding port is enabled and a bit cleared represents the corresponding port is disabled. As illustrated, a bit vector may be aligned with port IDs to associate enable fields with individual ports in each entry. As a result, here, updating an enable field to an enabled or disable value includes setting a bit or clearing a bit respectively. However, note that use of the term update does not necessarily include a change of state or value. For example, if a port is already disabled in an entry, then updating the port to a disabled value in the entry potentially includes no action, as the bit is already cleared. In addition, enable fields are not limited to a bit being set or cleared. In one embodiment, any known hardware or logic implementation for enabling or disabling a port or other logic may be utilized.

Disabling of a port may occur for any number of reasons. For example, port 432, as illustrated, is disabled due to it being physically unconnected or disconnected, i.e. no agent or device is coupled to port 432. However, a port, in one embodiment, is also disabled in response to receiving a port disable message on the port. In another embodiment, a port is disabled in response to receiving a return cycle message. Port disable and return cycle messaging are discussed in more detail below in reference to FIG. 5 and FIG. 7, respectively. Consequently, although not specifically shown, a port may be enabled in one routing entry for a target agent, and disabled in another routing entry for another target agent.

Figure 5:
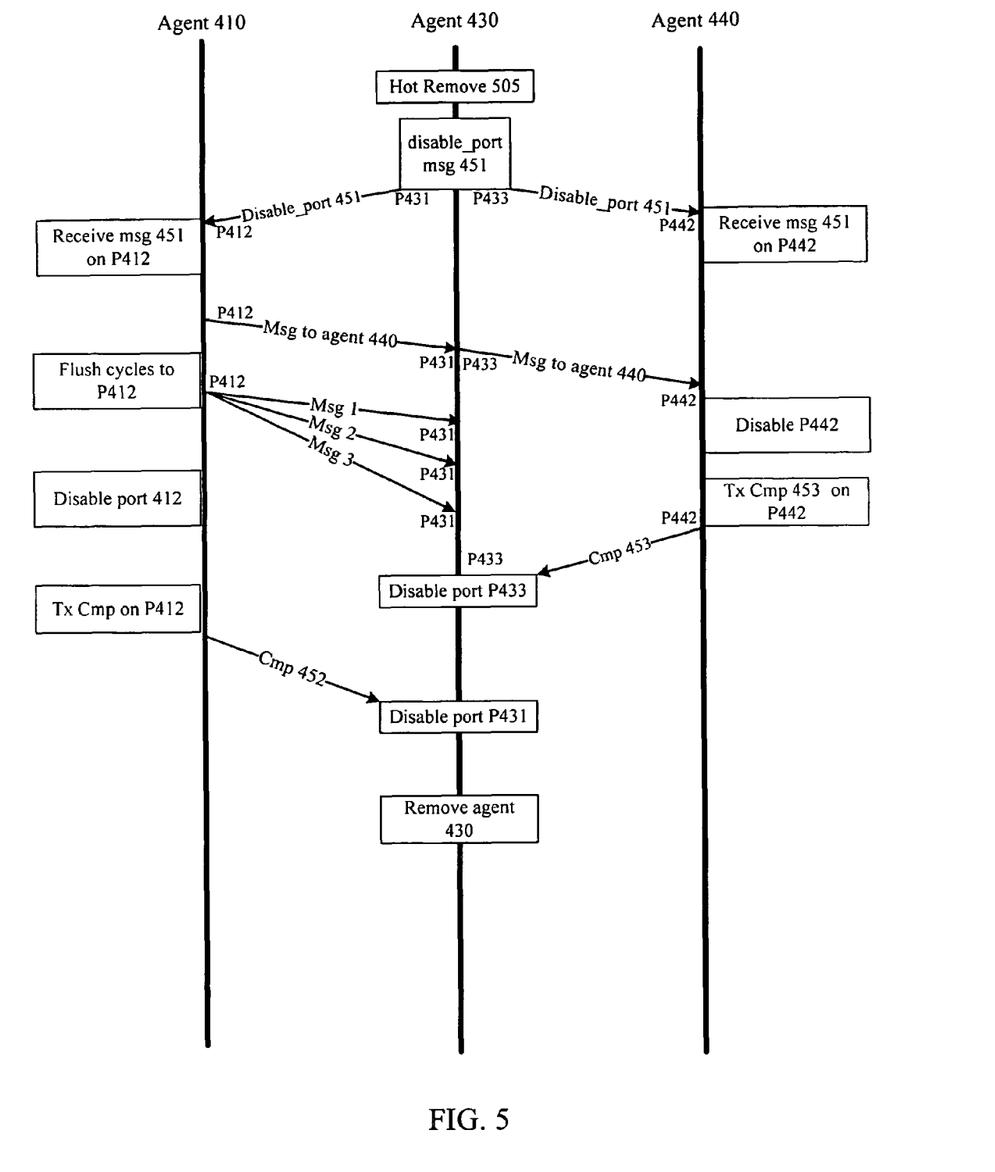
FIG. 5 illustrates an embodiment of a protocol/flow diagram for a hot removal of an agent.
Figure 6:
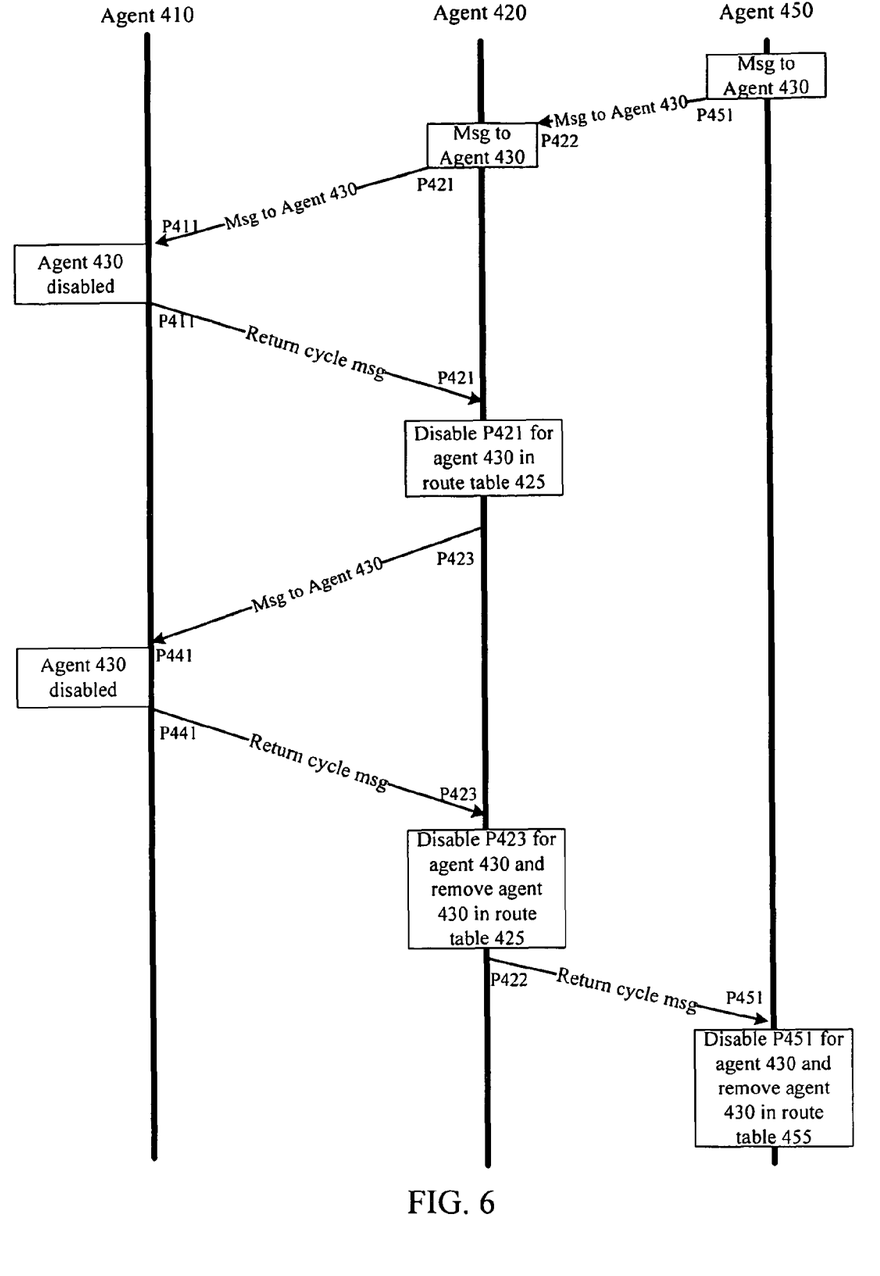
FIG. 6 illustrates an embodiment of a protocol/flow diagram for performing return cycles to disable ports for target agents.
Figure 7:
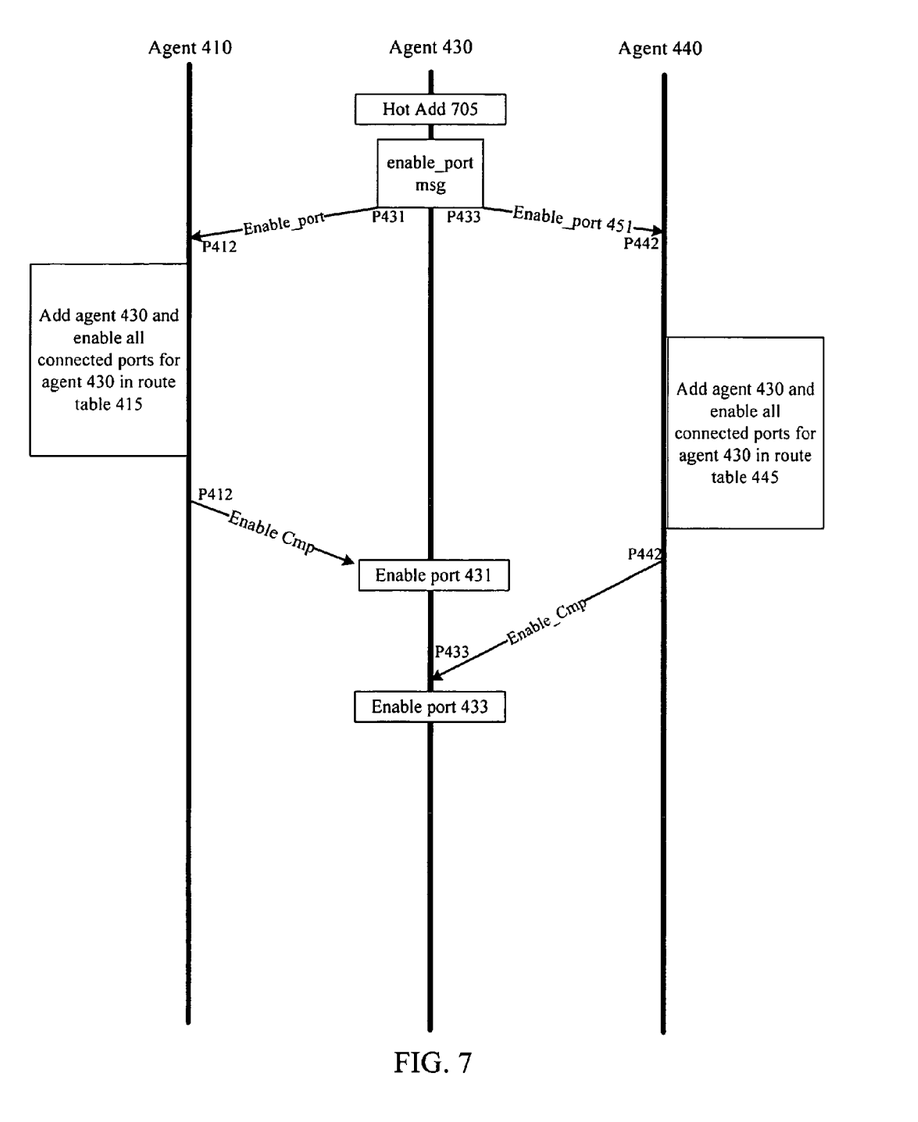
FIG. 7 illustrates an embodiment of a protocol/flow diagram for a hot addition of an agent.

Turning to FIG. 5, an embodiment of a protocol/block diagram for a hot removal of an agent is illustrated. Note that FIG. 5-7 illustrates protocols between a subset of agents illustrated in the interconnect architecture of FIG. 4. Furthermore, FIGS. 5-7 illustrates a specific embodiment of protocol flows in a substantially serial manner with specific illustrative messages. However, messages may be generated/transmitted in a different order, and as noted above, according to potentially time-warp in the interconnect architecture, messages may be received in a wholly different order. Furthermore, these messages, flows, and blocks may be performed serially, as well as in parallel.

In block 405, a hot remove event is detected for agent 430. In one embodiment, a hot remove event includes physical removal of an agent or device from the system. For example, if agent 430 includes a USB storage key, the storage key may be unplugged from the system. Often, this hot unplug occurs in one of two manners, which an Operating System often refers to as safe and unsafe ejection. In the safe ejection scenario, the software is notified of the ejection, i.e. a user selects to eject the device, and once the software removes its abstraction of the device, the device is safely removed. In the other scenario, the physical removal is performed and the software is left to remove the device later. Therefore, a hot removal event may include a software related event or a physical removal event. As an example of a software related event in a coherent architecture utilizing an interconnect stack, a higher level layer, such as an application layer, may transmit the software related event down through the stack to indicate a hot remove event.

However, a physical removal of an agent is potentially not the only hot removal of a device. In fact, in one embodiment, a hot removal of an agent includes removing, disabling, powering down, or simply hiding a device from the rest of the system either through use of hardware, software, firmware, or a combination thereof. Therefore, as a first illustrative example, a hot remove may occur when an agent wants to enter a low power state. Note that based on the design implementation a hot removal of an agent may be defined in any manner that includes the aforementioned examples or other known methods of removing a device from a system's or an OS' perspective.

In response to detecting the hot removal event 505, agent 430 generates disable port message 451. A disable port message includes any message to indicate to a receiving agent that a port is to be disabled. In one embodiment, the message includes a port identifier to indicate which port is to be disabled. Alternatively, the message simply indicates a port is to be disabled, and the port that the receiving agent receives the message on is the port to be disabled.

In one embodiment, the message is generated utilizing logic, such as protocol logic associated with a protocol layer. Here, rules potentially specify that message 451 is to be generated in response to detecting a defined removal event. Disable port message 451, in one embodiment, is transmitted to neighboring agents 410,440. As an example, in an interconnect stack, after generation, the message is transmitted utilizing logic, such as physical layer logic, to transmit the message.

Note from FIG. 4, that entry 436a of table 436, which is held in logic 435 of agent 430, indicates that a message to be routed to target agent 410 is preferable to be forwarded on port 431, i.e. the highest preference port for target agent 410. Similarly, entry 436c indicates that the message should be forwarded to agent 440 on port 433. Here, agent 410 and 440 receive disable port messages 451 on ports 412 and 442, respectively.

In one embodiment, agent 430 disables the ports it forwarded disable port message 451 on, i.e. ports 431,433, immediately. Alternatively, as illustrated, agent 430 waits for completion messages associated with the disable port messages to disable the corresponding ports. As a result, in this embodiment, when messages are received by agent 430 after a disable port message is sent but before a completion message is received, agent 430 continues to route messages on an enabled port. For example, agent 410 forwards a message (MSG) targeting agent 440 to agent 430. Since agent 430 has not received completion 453 to disable port 433, agent 430 forwards the message on port 433 to agent 440.

Furthermore, in one embodiment, receiving a disable port message, transmitting a completion thereto, or a combination thereof results in an agent flushing any queued cycles through a port. For example, agent 410 has Msg 1, Msg 2, and Msg 3 queued for forwarding to agent 430. Here, as a result of receiving disable port message 451, agent 410 flushes these messages out of the queue to agent 430. Note that the flush of cycles through port 412 is illustrated before disabling of port 412 and transmitting of a completion; however, cycles may be flushed in any order.

In response to receiving disable port messages on ports 412 and 442, agents 410 and 440 disable those ports, respectively. In other words, agent 410 receives a disable port message on port 412, so it disables port 412. In one embodiment, disabling port 412 includes disabling port 412 in each entry of routing table 416. For example, returning to FIG. 4, note that port 412 is disabled in all of entries 416a-e. In another embodiment, port 412 is disabled only in an entry corresponding to the source agent who generated the disable port message. Port 442 is disabled in a similar manner in routing logic 445 of agent 440. In another embodiment, agent 430 is removed from the participant list in table 416 in response to receiving a disable port message.

Agents 410 and 440 generate and transmit completion messages 452, 453, respectively, to agent 430. In response to receiving completion message 453 from agent 440 on port 433, agent 430 disables port 433. In one embodiment, as illustrated in FIG. 4, in response to a completion message, such as completion 453 from agent 440, port 433 is disabled in each entry of table 436. In other words, port 433 is disabled in entries 436a-e. Port 431 is disabled in table 436 in a similar manner, i.e. as illustrated port 431 is disabled in each entry 436a-e of routing table 436.

In one embodiment, in response to disabling all the ports, i.e. all the completions are received, the device is removed. Note from above, that removing may include any number of actions, such as a removal from software, a removal from hardware, powering down, or other removal action.

Turning to FIG. 6, an embodiment of a protocol/block diagram depicting a return cycle is illustrated. In one embodiment, a disable port message is transmitted to neighbors, and other nodes learn through normal attempted cycles to disable agents and/or ports to route thereto. In other words, a disable port message, here, disables a port of a neighbor of the hot removed device. As described below, the port that received that message is disabled in routing logic of the neighbor. Normal traffic results in return cycles, which are described below, that eventually disable ports in the other components associated with the hot removed device. Consequently, through the disable port message, as well as normal traffic and return cycle exchange, the interconnect architecture moves towards stable routing information from the hot remove.

As an example, agent 450 generates and transmits a message directed to agent 430. Based on routing logic 455 in node 450, the message is routed through port 451 to agent 420. Based on routing table 425 in agent 420, the message is further routed through port 421 to agent 410. Here, in one embodiment, in response to the port disable message, agent 410 disabled port 412. However, in the current preference list, nodes 413 and 411 are enabled for agent 430. Therefore, agent 410 may attempt to route through those ports to agent 430. However, as described in more detail below, the return cycle flow should eventually disable all ports for agent 430 in routing logic 415 of agent 410. In another embodiment described above, agent 430 is removed from the participant list in table 416 immediately.

Either way, eventually the message reaches agent 410 when agent 430 is disabled in routing logic 415, i.e. no ports in an entry are enabled for agent 430 or an entry for agent 430 does not exist. Here, when agent 410 cannot forward the message due to agent 430 being disabled in routing logic 415, in one embodiment, agent 410 generates/performs a return cycle. In one embodiment, a return cycle message includes the original message with a field or other flag set to identify it as a return cycle. However, in other embodiments, any method of indicating a message could not be forwarded is determined to be a return cycle. As a first example, the return cycle is provided back to the original source of the message, such as agent 450. As another example, the return cycle is provided back to the transmitting node preceding the current node in the transmission path.

Here, the return cycle message is provided back to agent 420. In one embodiment, when the return cycle message is received on port 421, port 421 is disabled for agent 430 in logic 425 of agent 420. As an example, in addition to disabling port 421, agent 420 may attempt to reroute the message on another enabled port for agent 430, such as on port 423 that routes through agent 440, agent 460 (since port 442 is disabled in agent 440), to agent 410 again. Agent 410 provides a similar return cycle message, which disables ports for agent 430 back through the path of agent 460, agent 440, and back to agent 420. When the message is returned to agent 420, port 423 is removed for agent 430 in routing logic 425, as a return cycle for a message directed to agent 430 was received on port 423. Here, in one embodiment, with all the ports disabled for agent 430 in logic 425, it can be said that agent 430 is removed from the participant list of table 416. Removal of an agent from a routing table, may include deleting the entry. However, in another embodiment, removing of an entry includes leaving the entry with all of the associated ports disabled.

As can be seen, agent 420 may not be immediately aware that agent 430 has been removed from the system, but it learns through attempted routing of messages that agent 430 has been removed. In other words, routing table 425 for agent 420 learns through routing of normal traffic that agent 430 has been removed. Here, if a cycle reaches a dead end, then through receiving of returned messages from normal cycles, routing logic 425 is able to discern, that agent 430 is unreachable. Similarly, in one embodiment described above, agent 410 may only disable the port a disable message is received on, and later, through the return cycle protocol may disable other enabled ports for agent 430 to essentially remove agent 430 from the participant list.

Also note that the return cycle message, when it reaches a dead end at agent 420, i.e. all ports are disabled for agent 430 in logic 425, the return cycle message is then forwarded back to agent 450. Here, agent 450 disables port 451 for agent 430 in logic 455. As a result, over time the interconnect architecture learns through disabling of ports that an agent has been removed, or at least that it is unreachable.

Although a hot remove is discussed in reference to FIG. 6 utilizing a disable port message that is transmitted to neighbor agents, a disable message or disable port message is not so limited. As an example, in one embodiment, a disable message is broadcast throughout the system, or an interconnect architecture. Here, each component broadcasts/forwards the disable message and updates its routing logic associated with the hot removed device. Note that the update of the routing logic may be similar to the methods described above, such as removing the hot removed agent from a participant list of routing logic and/or disabling all ports associated with the hot removed agent in the routing logic.

Referring next to FIG. 7, an embodiment of a protocol/block diagram for a hot add of an agent is illustrated. Here, a hot add is detected in block 705 for agent 430 instead of a hot remove in block 505 of FIG. 5. Essentially, a hot add includes the opposite of any of the potential embodiments of a hot remove described above. Therefore, if a hot removal includes physical removal of an agent from a system, then a hot add includes physical addition of the agent to a system, and similar for powering down/up and software removal/addition.

As a result of detecting a hot add associated with agent 430, an enable port message is generated by agent 430. In one embodiment, an enable port message is transmitted to all nodes in an interconnect network. Here, even in an embodiment where disable port messages are only sent to neighbors, an enable port message may be broadcast to all nodes. Alternatively, an enable port message, in another embodiment, is only transmitted to neighbor nodes, i.e. those nodes directly connected to agent 430.

As illustrated, agent 410 receives the enable message on port 412. Agent 430 may be added to the participant list, if there is no current entry for agent 430. In one embodiment, all of the ports, such as 411-413 are enabled in response to receiving an enable port message, even when the enable message is only received on a single port. Here, ports may be enabled that do not route to agent 430, but as above, agent 410 will learn over time that those ports should be disabled through return cycles. Furthermore, future routed cycles may be utilized to determine and dynamically alter the preference list for agent 430 in logic 415.

In another embodiment, only port 412 is enabled from receiving the enable port message. Here, multiple enable port messages may be received on different ports to enable the correct ports of agent 410 for routing to agent 430. Similarly, agent 440 receives an enable port message and configures its routing table for agent 430, accordingly. In one embodiment, enable port completion messages are transmitted back from agents 410,440, and ports 431,433, are enabled accordingly.

Therefore, as can be seen from above, modification of routing tables in an interconnect architecture in response to agent configuration changes may be performed dynamically instead of utilizing a quiescence state. As a result, the expensive nature of halting a system and having outside software/firmware reconfigure routing information is potentially avoided. Furthermore, through use of disable messages to neighbors and return cycles a system potentially learns of removed devices instead of having to broadcast a removal system wide, which potentially reduces unnecessary traffic. Moreover, ports for a target agent may be provided in a preference list that is dynamically alterable to ensure the most advantageous routing of packets during system operation.

A module as used herein refers to any hardware, software, firmware, or a combination thereof. Often module boundaries that are illustrated as separate commonly vary and potentially overlap. For example, a first and a second module may share hardware, software, firmware, or a combination thereof, while potentially retaining some independent hardware, software, or firmware. In one embodiment, use of the term logic includes hardware, such as transistors, registers, or other hardware, such as programmable logic devices. However, in another embodiment, logic also includes software or code integrated with hardware, such as firmware or micro-code.

A value, as used herein, includes any known representation of a number, a state, a logical state, or a binary logical state. Often, the use of logic levels, logic values, or logical values is also referred to as 1's and 0's, which simply represents binary logic states. For example, a 1 refers to a high logic level and 0 refers to a low logic level. In one embodiment, a storage cell, such as a transistor or flash cell, may be capable of holding a single logical value or multiple logical values. However, other representations of values in computer systems have been used. For example the decimal number ten may also be represented as a binary value of 1010 and a hexadecimal letter A. Therefore, a value includes any representation of information capable of being held in a computer system.

Moreover, states may be represented by values or portions of values. As an example, a first value, such as a logical one, may represent a default or initial state, while a second value, such as a logical zero, may represent a non-default state. In addition, the terms reset and set, in one embodiment, refer to a default and an updated value or state, respectively. For example, a default value potentially includes a high logical value, i.e. reset, while an updated value potentially includes a low logical value, i.e. set. Note that any combination of values may be utilized to represent any number of states.

The embodiments of methods, hardware, software, firmware or code set forth above may be implemented via instructions or code stored on a machine-accessible or machine readable medium which are executable by a processing element. A machine-accessible/readable medium includes any mechanism that provides (i.e., stores and/or transmits) information in a form readable by a machine, such as a computer or electronic system. For example, a machine-accessible medium includes random-access memory (RAM), such as static RAM (SRAM) or dynamic RAM (DRAM); ROM; magnetic or optical storage medium; flash memory devices; electrical storage device, optical storage devices, acoustical storage devices or other form of propagated signal (e.g., carrier waves, infrared signals, digital signals) storage device; etc. For example, a machine may access a storage device through receiving a propagated signal, such as a carrier wave, from a medium capable of holding the information to be transmitted on the propagated signal.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In the foregoing specification, a detailed description has been given with reference to specific exemplary embodiments. It will, however, be evident that various modifications and changes may be made thereto without departing from the broader spirit and scope of the invention as set forth in the appended claims. The specification and drawings are, accordingly, to be regarded in an illustrative sense rather than a restrictive sense. Furthermore, the foregoing use of embodiment and other exemplarily language does not necessarily refer to the same embodiment or the same example, but may refer to different and distinct embodiments, as well as potentially the same embodiment.

What is claimed is:

1. An apparatus comprising: an interconnect agent including,
   a plurality of ports coupled through point-to-point links to a plurality of agents; and
   first logic adapted to hold a routing table that is to include a target entry, the target entry being adapted to associate the plurality of ports, according to a preferential order, with a target agent; and
   routing logic adapted to route a packet destined for the target agent through a port of the plurality of ports based on the port of the plurality of ports, being a highest preference port, according to the preferential order, associated with the target agent, wherein the target agent is to be removable in response to disabling all of the plurality of ports that are associated with the target agent, wherein disabling of all the plurality of ports is to be based on receipt of completion messages associated with generated disable messages on all of the plurality of ports.

2. The apparatus of claim 1, wherein the target entry to associate the plurality of ports, according to the preferential order, with a target agent is one of a plurality of target entries to associate the plurality of ports, according to a preferential order, with a plurality of target agents.

3. The apparatus of claim 1, wherein first logic is to dynamically configuring the target entry to associate the plurality of ports, according to a different preferential order based on a routing factor, wherein the routing factor is selected from a group consisting of a recently disabled port of the plurality of ports, a number of hops to the target entry associated with a port of the plurality of ports, and a routing time through a port of the plurality of ports to the target agent.

4. The apparatus of claim 1, wherein first logic to hold a routing table to include a target entry, the target entry to associate the plurality of ports, according to a preferential order, with a target agent comprises the entry to include a plurality of port identifiers corresponding to the plurality of ports listed by preference in a preference list.

5. The apparatus of claim 4, wherein each of the plurality of port identifiers is associated with an enable field.

6. The apparatus of claim 5, wherein an enable field associated with a first port of the plurality of ports is to be updated to a disabled value in response to receiving a return cycle message on the first port.

7. The apparatus of claim 5, wherein an enable field associated with a first port of the plurality of ports is to be updated to a disabled value in response to receiving a completion message on the first port associated with a disable port message previously transmitted by the interconnect agent on the first port.

8. An apparatus comprising: an interconnect agent including,
   a plurality of ports coupled through point-to-point links to a plurality of agents; and
   first logic adapted to hold a routing table that is to include a target entry, the target entry being adapted to associate the plurality of ports, according to a preferential order, with a target agent, wherein more than one of the plurality of ports is associated with the target agent; and
   routing logic adapted to route a packet destined for the target agent through a port of the plurality of ports based on the port of the plurality of ports, being a highest preference port, according to the preferential order, associated with the target agent, wherein the target agent is to be removable in response to disabling all of the plurality of ports that are associated with the target agent.

9. The apparatus of claim 8, wherein the target entry to associate the plurality of ports, according to the preferential order, with a target agent is one of a plurality of target entries to associate the plurality of ports, according to a preferential order, with a plurality of target agents.

10. The apparatus of claim 8, wherein first logic is to dynamically configuring the target entry to associate the plurality of ports, according to a different preferential order based on a routing factor, wherein the routing factor is selected from a group consisting of a recently disabled port of the plurality of ports, a number of hops to the target entry associated with a port of the plurality of ports, and a routing time through a port of the plurality of ports to the target agent.

11. The apparatus of claim 8, wherein first logic to hold a routing table to include a target entry, the target entry to associate the plurality of ports, according to a preferential order, with a target agent comprises the entry to include a plurality of port identifiers corresponding to the plurality of ports listed by preference in a preference list.

12. The apparatus of claim 11, wherein each of the plurality of port identifiers is associated with an enable field.

13. The apparatus of claim 12, wherein an enable field associated with a first port of the plurality of ports is to be updated to a disabled value in response to receiving a return cycle message on the first port.

14. The apparatus of claim 13, wherein an enable field associated with a first port of the plurality of ports is to be updated to a disabled value in response to receiving a completion message on the first port associated with a disable port message previously transmitted by the interconnect agent on the first port.

15. A method comprising:
   storing a routing table that is to include a target entry, the target entry being adapted to associate a plurality of ports, according to a preferential order, with a target agent, wherein more than one of the plurality of ports is associated with the target agent; and
   routing a packet destined for the target agent through a port of the plurality of ports based on the port of the plurality of ports, being a highest preference port, according to the preferential order, associated with the target agent, wherein the target agent is to be removable in response to disabling all of the plurality of ports that are associated with the target agent.

16. The method of claim 15, wherein the target entry to associate the plurality of ports, according to the preferential order, with a target agent is one of a plurality of target entries to associate the plurality of ports, according to a preferential order, with a plurality of target agents.

17. The method of claim 15, comprising dynamically configuring the target entry to associate the plurality of ports, according to a different preferential order based on a routing factor, wherein the routing factor is selected from a group consisting of a recently disabled port of the plurality of ports, a number of hops to the target entry associated with a port of the plurality of ports, and a routing time through a port of the plurality of ports to the target agent.

18. The method of claim 15, wherein first logic to hold a routing table to include a target entry, the target entry to associate the plurality of ports, according to a preferential order, with a target agent comprises the entry to include a plurality of port identifiers corresponding to the plurality of ports listed by preference in a preference list.

19. The method of claim 18, comprising associating each of the plurality of port identifiers with an enable field.

20. The method of claim 19, comprising updating an enable field associated with a first port of the plurality of ports to a disabled value in response to receiving a return cycle message on the first port.

* * * * *